United States Patent [19]

Anderson

[11] 4,139,319
[45] Feb. 13, 1979

[54] MOTOR VEHICLE RUBBER TIRES AND CONCRETE REVETMENT

[75] Inventor: Emmett C. Anderson, 1707 Taylor St., NW., Washington, D.C. 20011

[73] Assignee: Emmett C. Anderson, Washington, D.C.

[21] Appl. No.: 865,585

[22] Filed: Dec. 29, 1977

[51] Int. Cl.² .............................................. E02B 3/12
[52] U.S. Cl. ........................................ 405/16; 405/15
[58] Field of Search ......................................... 61/3–5, 61/37, 38, 63

[56] References Cited

U.S. PATENT DOCUMENTS

| 589,856 | 9/1897 | Rabitz | 61/37 |
| 2,295,422 | 9/1942 | Neely et al. | 61/38 |
| 3,234,741 | 2/1966 | Ionides | 61/37 X |

FOREIGN PATENT DOCUMENTS

| 2351701 | 4/1975 | Fed. Rep. of Germany | 61/37 |
| 2603515 | 8/1977 | Fed. Rep. of Germany | 61/37 |

Primary Examiner—Dennis L. Taylor

[57] ABSTRACT

A monolithical revetment made of motor vehicle rubber tires and concrete.

1 Claim, 5 Drawing Figures

MOTOR VEHICLE RUBBER TIRES AND CONCRETE REVETMENT

The present invention relates to a novel flexible revetment mat, that withstands twisting, bending, shock and settling caused by flowing water. Because of its characteristics it is most particularly adopted to prevent the erosion of earth subject to flowing water.

The object of the present invention is to provide a novel flexible revetment mat made of Motor Vehicle Rubber Tires woven together with Weaving Reinforcing Holding Rods and Concrete, that piotects river banks from erosion.

A description of the drawings will now be explained, in which

Figure 1:
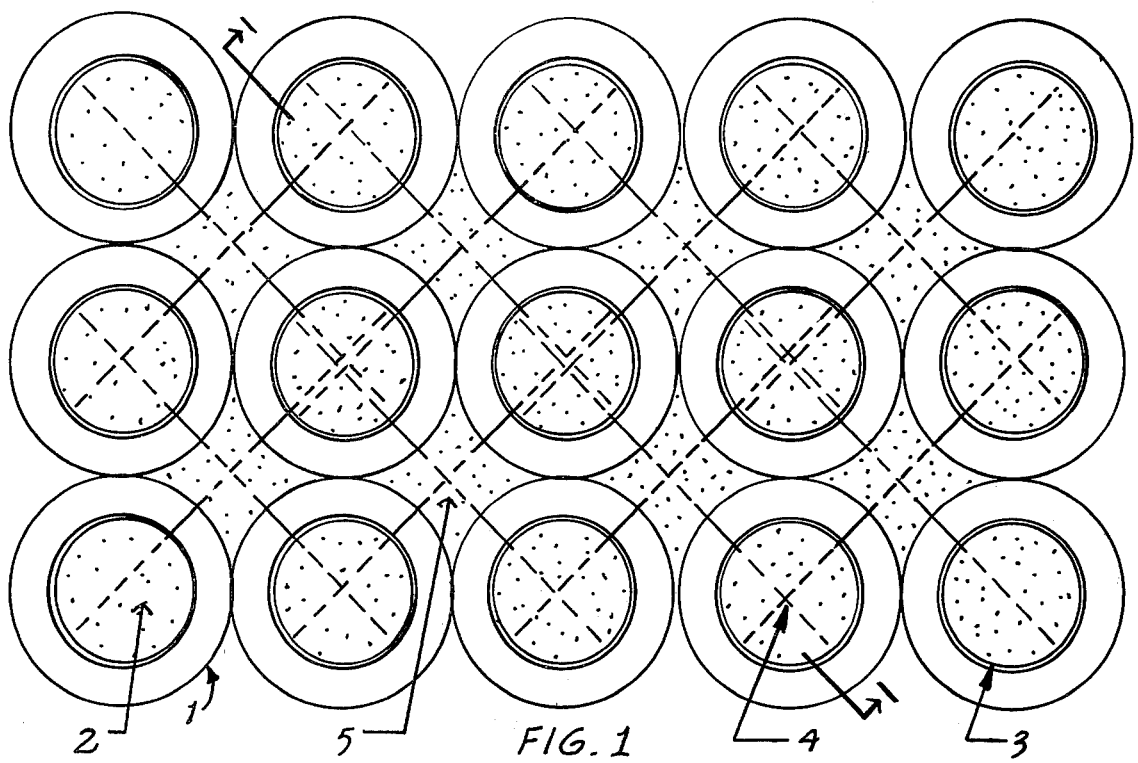
FIG. 1 is a plan.
Figure 2:
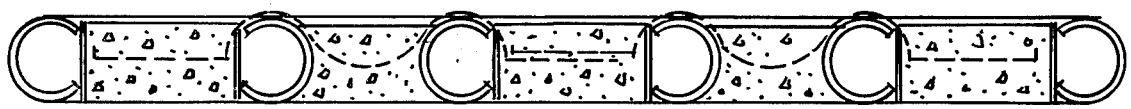
FIG. 2 is a cross section of FIG. 1 along line 1—1.
Figure 3:
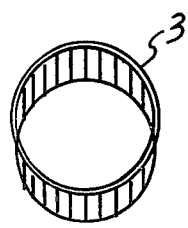
FIG. 3 is an isometric.
Figure 4:
FIG. 4 is a side elevation of the rod.
Figure 5:
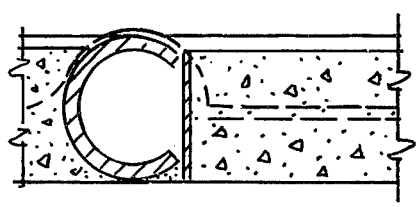
FIG. 5 is an enlarge partial view of the same cross section as FIG. 2.

Referring to FIG. 1, it will be seen the flexible revetment mat made of a plurality of automobile tires arranged tangent latitudinal and longitudinal in a forizontal plan; each tire has a rim form 3 filled with concrete 2 that occupies space normally by steel rim when the tire is used on an automobile, and each space bounded by a plurality of tires is filled with concrete 5, reinforcing rod 4 is arranged in concrete 2 and 5 extending at least between two tires, that are tangent to two other tires, by extending along a horizontal plane and approximately midway of concrete 2 in the rim form 3, over the body of tire 1, down and passing into approximately the midway of concrete 5 bound by a plurality of tires and crosses the reinforcing rod 4 between two other tires and their concrete 2 in rim form 3 and the concrete 5 bound by a plurality of tires, than over the body of the second tire 1, down and passing horizontally into approximately the mid portion of concrete 2 in rim form 3.

I claim as my invention:

1. A flexible monolithic mat of motor vehicle rubber tires woven together with eaving reinforcing holding rods and concrete comprising; a plurality of rubber tires arranged in a horizontal plane comprised of at least four tires tangent to each other with each tire being tangent to at least two of the other tires, each tire having a concrete rim form in the area normally occupied by the steel rim when the tire is used on an automobile, each form being filled with concrete and the area bound by the plurality of tires being filled with concrete, reinforcing rods arranged in the concrete and extending between at least two of the tires, the reinforcing rods which extends between any two of the tires crossing the reinforcing rods of the other two tires, the reinforcing rods extending along a horizontal plane and being approximately midway of the concrete in the rim and passing from the body of the tire into approximately the mid portion of the concrete bound by the plurality of tires and passing from the body of the other rire of the at least two tires and into approximately the mid portion of concrete in the rim of the other tire.

* * * * *